United States Patent [19]

Bremer et al.

[11] Patent Number: 4,503,545
[45] Date of Patent: Mar. 5, 1985

[54] SYSTEM FOR EVALUATING TRANSMISSION LINE IMPAIRMENTS

[75] Inventors: Gordon Bremer, Clearwater; Robert Wachtel, Tampa, both of Fla.

[73] Assignee: Paradyne Corporation, Largo, Fla.

[21] Appl. No.: 316,098

[22] Filed: Oct. 28, 1981

Related U.S. Application Data

[63] Continuation of Ser. No. 122,329, Feb. 19, 1980, abandoned.

[51] Int. Cl.³ .............................................. H04B 15/02
[52] U.S. Cl. .................................... 375/34; 375/101; 364/574
[58] Field of Search ....................... 375/11, 14, 17, 18, 375/34, 58, 101; 455/295, 296, 312; 364/574; 328/162, 163, 164, 165

[56] References Cited

U.S. PATENT DOCUMENTS

| 3,611,149 | 10/1971 | Kimball | 375/101 |
| 3,688,196 | 8/1972 | Doelz | 375/39 |
| 3,988,539 | 10/1976 | Motley et al. | 375/39 |
| 4,032,847 | 6/1977 | Unkauf | 375/101 |
| 4,035,625 | 7/1977 | Chiu et al. | 375/14 |
| 4,114,710 | 9/1978 | Katoh et al. | 375/39 |

Primary Examiner—Robert L. Griffin
Assistant Examiner—Stephen Chin
Attorney, Agent, or Firm—Kane, Dalsimer, Kane, Sullivan & Kurucz

[57] ABSTRACT

A data communication system which includes a transmitter and a receiver is used in QAM or PSK modulation. The receiver provides a signal space pattern wherein each point is defined in a coordinate system in which a first axis is the in-phase channel axis and a second axis is the quadrature channel axis in the signal space diagram. Additionally, the receiver determines the parameters for reducing the intersymbol interference of the received signal.

6 Claims, 17 Drawing Figures

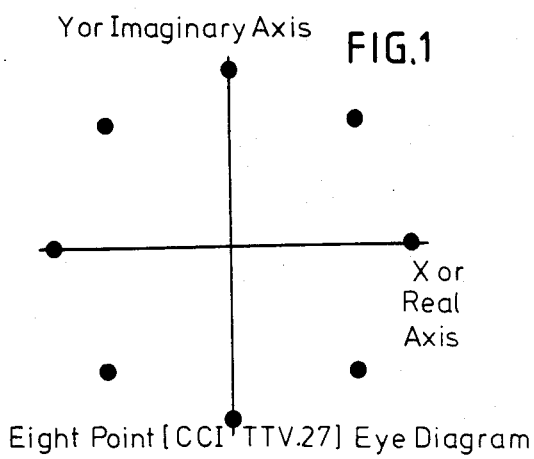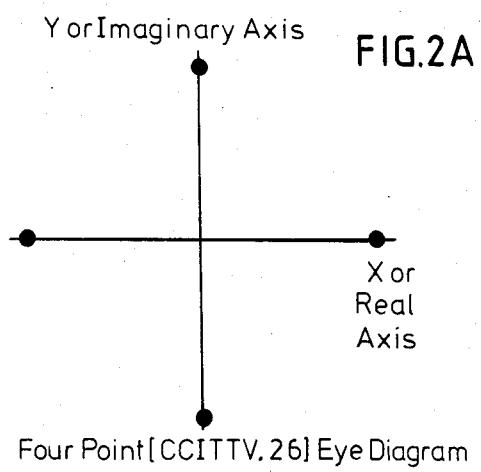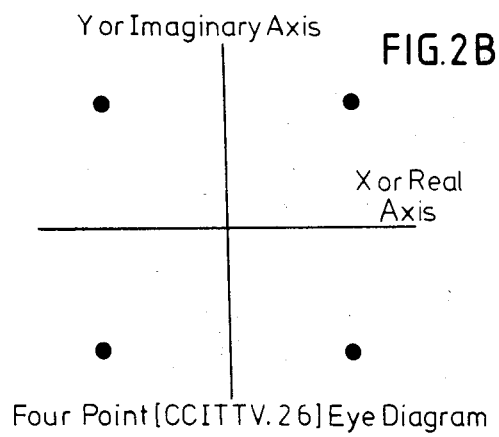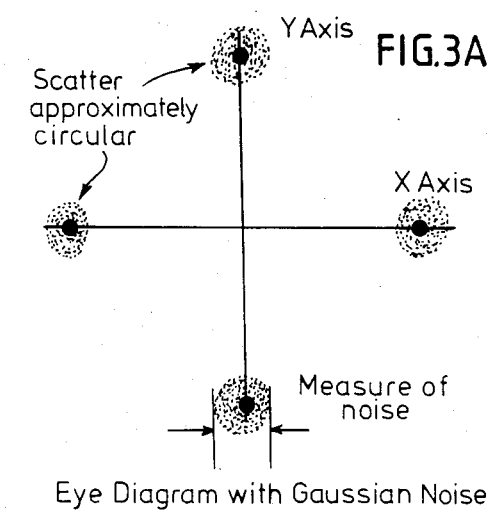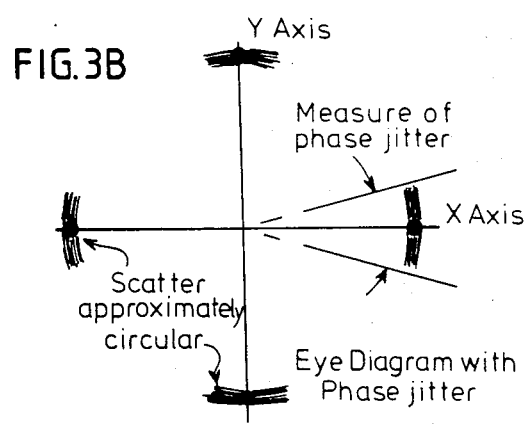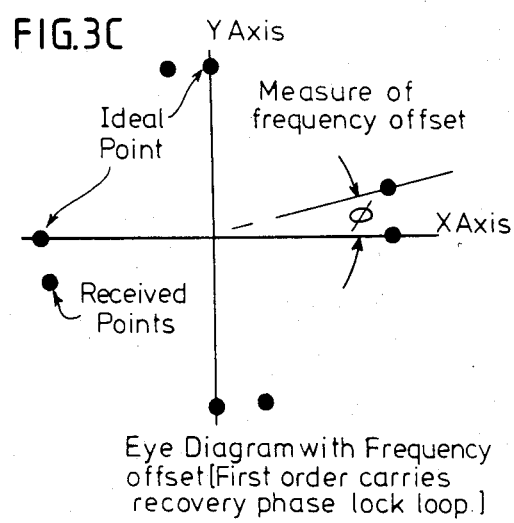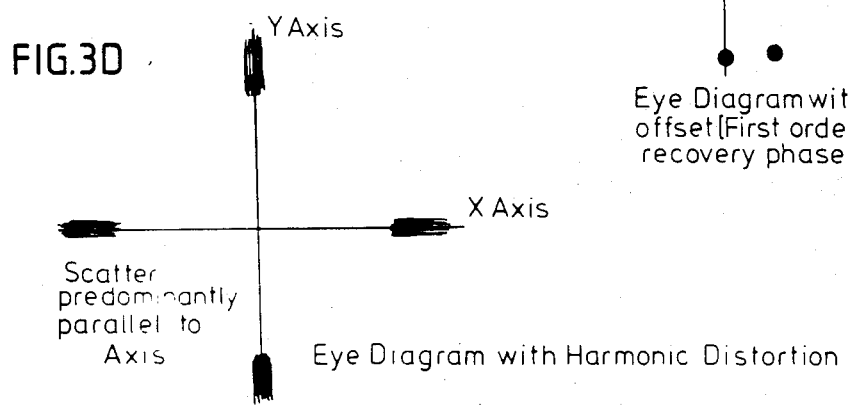

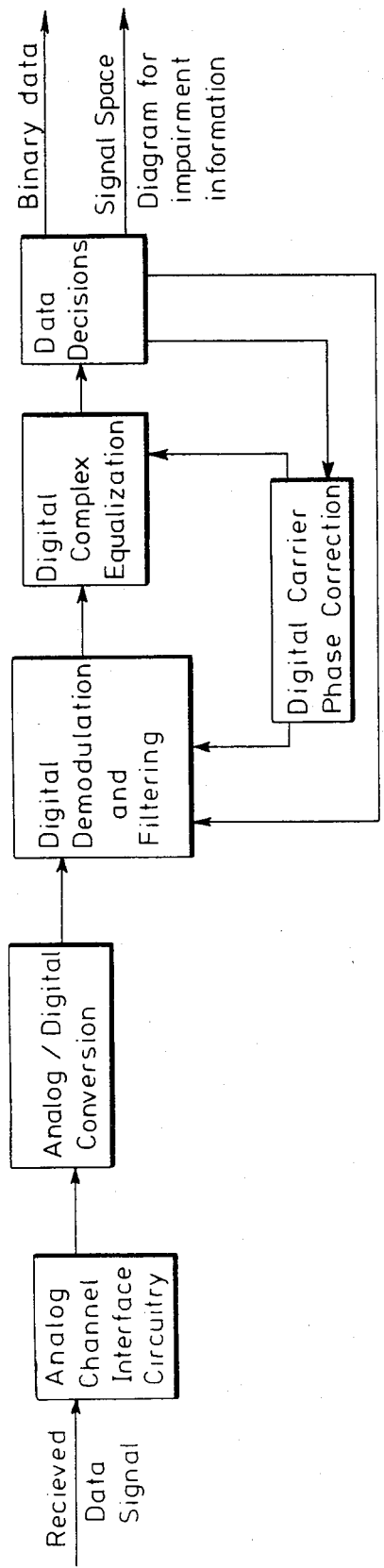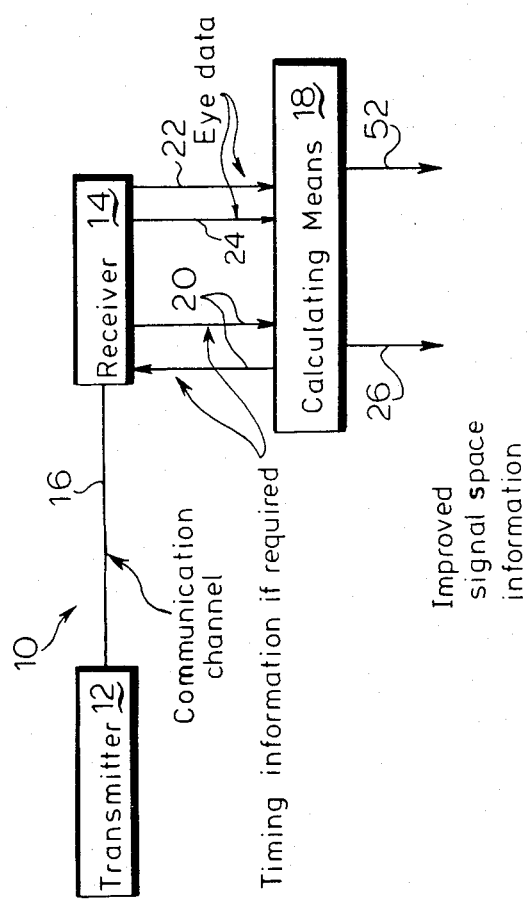

DECISION ALGORITHM

IBRD ALGORITHM

| Sign[REAL(Y)] | Sign[IMAG.(Y)] | Signal Space Coordinate, $R_i$ |
|---|---|---|
| + | + | $R_1$ |
| − | + | $R_2$ |
| − | − | $R_3$ |
| + | − | $R_4$ |

| Present Value of R | Previous Value of R | First Bit of IBRD | Second Bit of IBRD |
|---|---|---|---|
| $R_1$ | $R_1$ | 0 | 0 |
| $R_1$ | $R_2$ | 1 | 0 |
| $R_1$ | $R_3$ | 1 | 1 |
| $R_1$ | $R_4$ | 0 | 1 |
| $R_2$ | $R_1$ | 0 | 1 |
| $R_2$ | $R_2$ | 0 | 0 |
| $R_2$ | $R_3$ | 1 | 0 |
| $R_2$ | $R_4$ | 1 | 1 |
| $R_3$ | $R_1$ | 1 | 1 |
| $R_3$ | $R_2$ | 0 | 1 |
| $R_3$ | $R_3$ | 0 | 0 |
| $R_3$ | $R_4$ | 1 | 0 |
| $R_4$ | $R_1$ | 1 | 0 |
| $R_4$ | $R_2$ | 1 | 1 |
| $R_4$ | $R_3$ | 0 | 1 |
| $R_4$ | $R_4$ | 0 | 0 |

SYSTEM FOR EVALUATING TRANSMISSION LINE IMPAIRMENTS

This is a continuation of application Ser. No. 122,329, filed Feb. 19, 1980 now abandoned.

BACKGROUND OF THE INVENTION

The present invention relates to data communications and in particular to a system for the improved measurement of impairments in a data communication channel employing quadrature amplitude modulation—QAM or phase shift keying modulation PSK.

The performance of QAM and PSK data transmission systems can be evaluated qualitatively by the subjective evaluation of received data signal space diagrams. U.S. Pat. No. 4,035,625 for example refers to a quantitative technique for measuring channel impairments by a subjective evaluation of eye diagrams and discusses the technique in some detail.

With the increased usage of QAM and PSK modulated transmission systems, which has occurred in recent times, qualitative analysis of the signal constellation diagrams (sample eye diagrams on a 2-dimensional plane) has been used as a means of evaluating the performance of the various types of QAM and PSK systems.

In FIGS. 1 and 2 herein there are shown respectively 8 and 4 point idealized signal constellations or signal space diagrams. The horizontal axis of these diagrams may be referred to as the real, "X" or in-phase channel axis. The vertical axis may be referred to as the imaginary, "Y" or quadrature channel axis. FIG. 1 depicts an 8 point signal space diagram obtained by combining the 4 point signal space diagrams depicted in FIGS. 2A and 2B. 16 point diagrams are also obtainable as discussed in the above noted U.S. Pat. No. 4,035,625.

The signal space diagrams may be typically viewed by a technician or operator on an oscilloscope screen by modulating the horizontal axis with the X-signal and the vertical axis with Y-signal.

Degradation of the communication channel manifests itself on the diagram in relatively well defined modes, the more common of which are depicted in FIGS. 3A-3D which in its ideal form would correspond to FIG. 2A. Thus, if the communication medium is degraded by gaussian noise, the small clearly defined dots of the receiver signal space diagram depicted in FIG. 2A would enlarge to roughly circular areas as a result of the noise having been added to the data signal. This is shown in FIG. 3A wherein the diameter of the circular areas is a measure of the noise. Phase jitter contributed by the communications media results in the clear defined dots of FIG. 2A being displaced as an arc centered at the ideal points. This is depicted in FIG. 3B. Frequency offset and harmonic distortion cause the unique changes in the diagram as depicted in FIGS. 3C and 3D respectively.

As noted, since the various distortions manifest themselves in a unique fashion on the signal space diagram, it would appear that a qualitative determination of the communications channel impairment could be made by study of the diagram. In actual practice, however, the situation becomes complicated by the fact that the degrading influences can be cumulative and thus the clearly defined patterns depicted in FIGS. 3A-3D become distorted by the interaction of the combination of degrading factors. In addition, the signal space diagram data does not directly lend itself to accurate quantitative analysis of the condition of the communications channel.

Copending, commonly assigned application Ser. No. 16,912 filed Mar. 2, 1979 and entitled "System for the Quantitative Measurement of Impairments in the Communication Channel of a Quadrature Amplitude Modulation Data Communication System" addresses itself to a system for evaluating data transmission over a communication media in the face of the interaction of the degrading influences. In addition to the interaction of degrading influences another type of interference is also present in these systems which is referred to as intersymbol interference. This type of interference is caused by an overlap in time between successive received data symbols; the extraneous energy from the signal in one or more keying intervals tending to interfere with the reception of the signal in another keying interval. A technique to reduce the influence of intersymbol interference can be utilized in modem designs since this channel impairment can be determined and as such can be removed through the use of automatic equalizer technology. FIG. 4A shows a block diagram of the receiver of a general modem in which a complex equalizer is utilized after the digital conversion but prior to the decision algorithm in order to reduce the influence of intersymbol interference. The invention in application Ser. No. 16,912 considered that system of FIG. 4A, specifically including the equalizer, is utilized and as such that the scatter of the space diagram due to line impairments could be quantized and analysis could be performed on the quantized data without consideration of the influence of intersymbol interference. There are however commercially available demodulator integrated circuits typified by the block diagram of FIG. 4B which do not include the implementation of automatic equalizers to remove intersymbol interference. Such interference being manifest, the analysis of signal space patterns becomes increasingly complicated.

SUMMARY OF THE INVENTION

It is the principal object of the present invention to provide an improved system for qualitatively evaluating data transmission over a communication media by eliminating intersymbol interference when it occurs.

In accordance with the present invention, a data communication system comprising a transmitter, receiver, modulation means for quadrature amplitude modulating (or PSK) data transmitted over the communication channel to the receiver, and a communications channel linking the transmitter to the receiver is provided. An automatic equalizer is not required but need not be specifically omitted. A signal constellation or signal space pattern, possibly including intersymbol interference is available at the receiver.

The present invention provides for the phase rotation of each received point by a determined phase angle to normalize all data points to one "ideal" coordinate. Each received point may or may not be equalized.

BRIEF DESCRIPTION OF THE DRAWINGS

In the accompanying drawings:

FIG. 1 is an ideal 8 point signal constellation or signal space diagram;

FIGS. 2A and 2B illustrate two ideal 4 point signal space diagrams;

FIGS. 3A-3D illustrate the manner in which various line impairments reflect themselves on the diagram of FIG. 2A;

FIG. 4A is a block diagram of the stages of a typical modem receiver utilizing a dynamic equalizer in the demodulator;

FIG. 5 is a block diagram of a communications system incorporating the present invention;

DETAILED DESCRIPTION OF THE PREFERRED EMBODIMENT

Figure 4B:
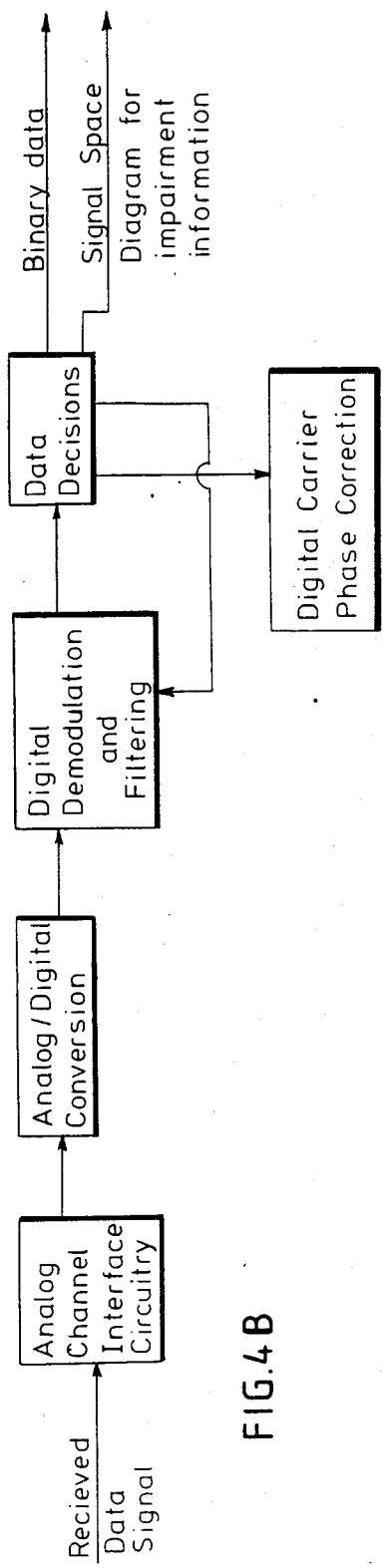
FIG. 4B is a block diagram of the stages of a typical modem receiver having no equalizer in the demodulator.

Reference is now made to FIG. 5 wherein a typical communications system 10 incorporating the present invention is depicted. The communications system is comprised of a transmitter 12, receiver 14, and a communications channel or link 16 interconnecting the two. The channel may, for example comprise a commercial military or foreign voice grade telephone line interconnecting the transmitting and receiving station both of which are provided with communication modems, the receiving modem at least, generating a signal constellations or signal space diagram. The transmitter 12 employs QAM or PSK modulation and each symbol time transmits one of four phases of a carrier which is equivalent to transmitting one of two amplitude levels on each of two quadrature carriers as discussed in aforementioned application Ser. No. 16,912 and illustrated in FIG. 4 herein.

Communication channel 16 is four-wire full duplex or simplex. It also may be comprised of PCM links, microwave links, or any other transmission means utilized in telephone, etc.

The receiver 14 is a QAM receiver which detects one of the four possible phases of each symbol time and outputs two corresponding data bits at a symbol rate R. Hence, the bit rate of the communication system is 2R bits per second. If R equaled 1200 then the data rate is 2400 bits per second.

Figure 6:
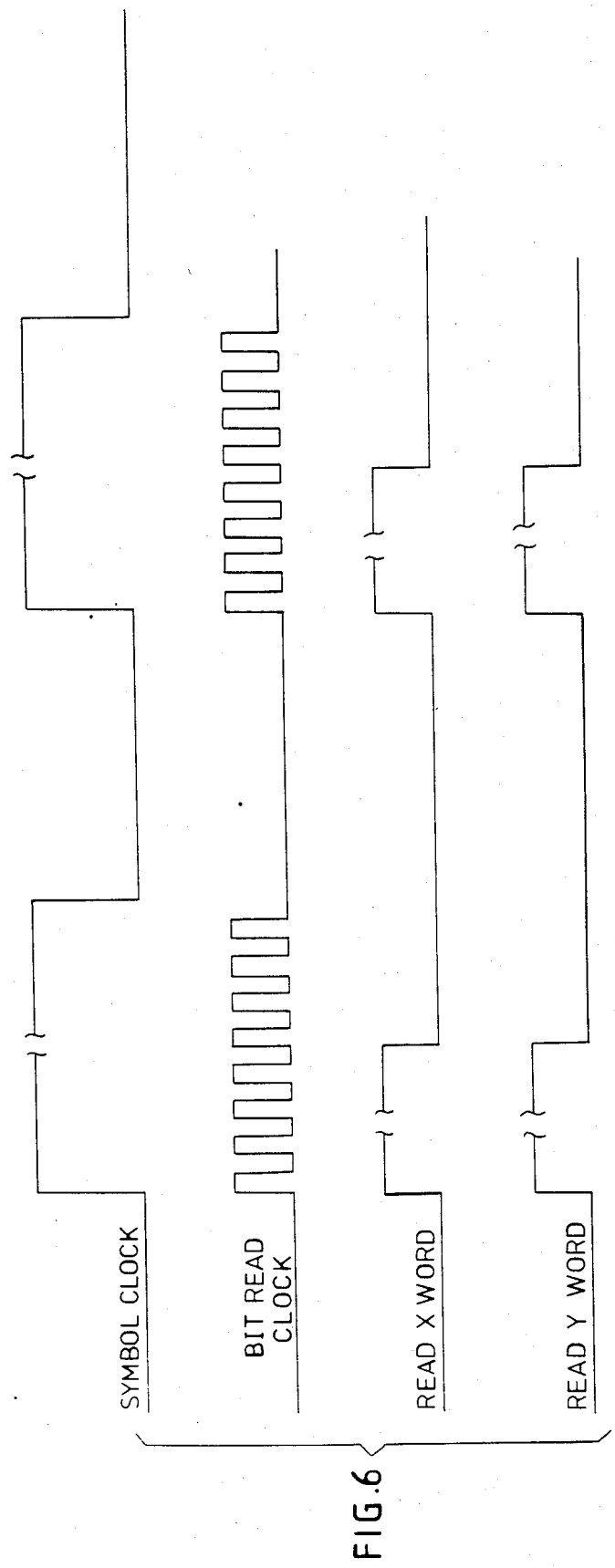
FIG. 6 is a timing signal diagram depicting the relationship of the various signals.

The above described system is well known, defined in the art and commercially available from several sources. In accordance with the present invention, a calculating means 18 is provided auxiliary to the receiver 14. The calculating means provides several functions. It is capable of reading X and Y signal space data from the receiver each symbol time. A symbol clock 1200 Hz and a higher speed clock 14.4 KHz are supplied to the calculating means 18 from receiver 14 via channels 20. Two channels, 22 and 24 also extend between receiver 14 and calculating means 18 for passing X and Y data bits from the receiver to the calculating means. Timing of the various signals is shown in FIG. 6.

At the positive transition of the symbol clock (1200 Hz) the values of the X component and Y component of the signal constellation or signal space diagram are available in digital form. On the first negative edge of the bit clock which appears after the symbol clock, the first data bit of the 8 bit word corresponding to the value of X and Y is available. The calculating means uses this negative transition to read the first bit of X and Y. On each of the seven subsequent negative edges of bit clock the remaining seven data bits of X and Y are read from receiver 14 to calculating means 18. This process is repeated for each symbol time. Hence, by means of the timing signals—and data lines 22 and 24—the calculating means is capable of accumulating digital words which correspond to the values of the X and Y components of the signal spaced diagram.

The invention in application Ser. No. 16,912 used this information to provide a technique to quantitatively calculate line impairments. The system disclosed herein also utilizes that technique. In addition however provision is made to eliminate intersymbol interference with the signal space data when it exists prior to the utilization.

The calculating means 18 utilizes the space diagram information 22 and provides an algorithm which first estimates intersymbol interferences from this information. This algorithm makes this estimation based on information from many collected samples of space diagram information 22 without regard to usual data pattern randomness criteria as required in prior art modem systems utilizing an adaptive equalizer as shown in FIG. 4A, this randomnization not being typically provided in non-equalized modem systems such as that shown in FIG. 4B. Based on this estimation the calculating means 18 then removes the intersymbol interference from the space diagram information 22 and hence provides much improved space diagram information which does not contain significant intersymbol interference and is thus usable for calculating other transmission channel impairments as discussed above.

The improved signal space diagram information may be used as described above for calculation of impairments. It may also be used to provide improved binary received data determined from data decisions from the improved signal space information rather than the original signal space data determined within the modem itself.

When the improved signal space information is utilized only to provide improved transmission channel impairment measurement, further attributes of the present invention may be utilized which permit circuit implementation using simpler components which are not capable of performing typical adaptive equalization in a modem system such as in FIG. 4A. As a result implementation may be allowed at a reduced cost. The first of these attributes is that calculation of intersymbol interference estimates need not be performed or improved each symbol time or at least every few symbol times as is essentially required in systems such as FIG. 4A. In this invention the intersymbol interference calculation need only be performed occasionally at a rate commensurate the time required between calculations of channel impairments. In the present invention calculations need only proceed at less than 1/10 the speed of those calculations required in the modem system of FIG. 4A.

A related attribute is the fact that the improved signal space information need not be calculated each symbol time as is essentially required in the system of FIG. 4A. The new signal space information need only be calculated when it becomes necessary to calculate an improved intersymbol interference estimate or when it is desirable to use the improved signal space information to calculate transmission channel impairments.

As a result until good intersymbol interference estimation is achieved, the new improved signal space information calculations need only be made at less than 1/10 the speed of similar calculations required in FIG. 4A. Once a good intersymbol interference estimate is achieved, improved signal space information calculations can proceed at an even lower rate commensurate with the need for transmission channel impairment calculations.

The above two attributes may permit the calculation means 18 to be implemented at a lower cost and or this circuity may be used for other unrelated functions during the time it is not needed for the algorithm described.

Figure 7:
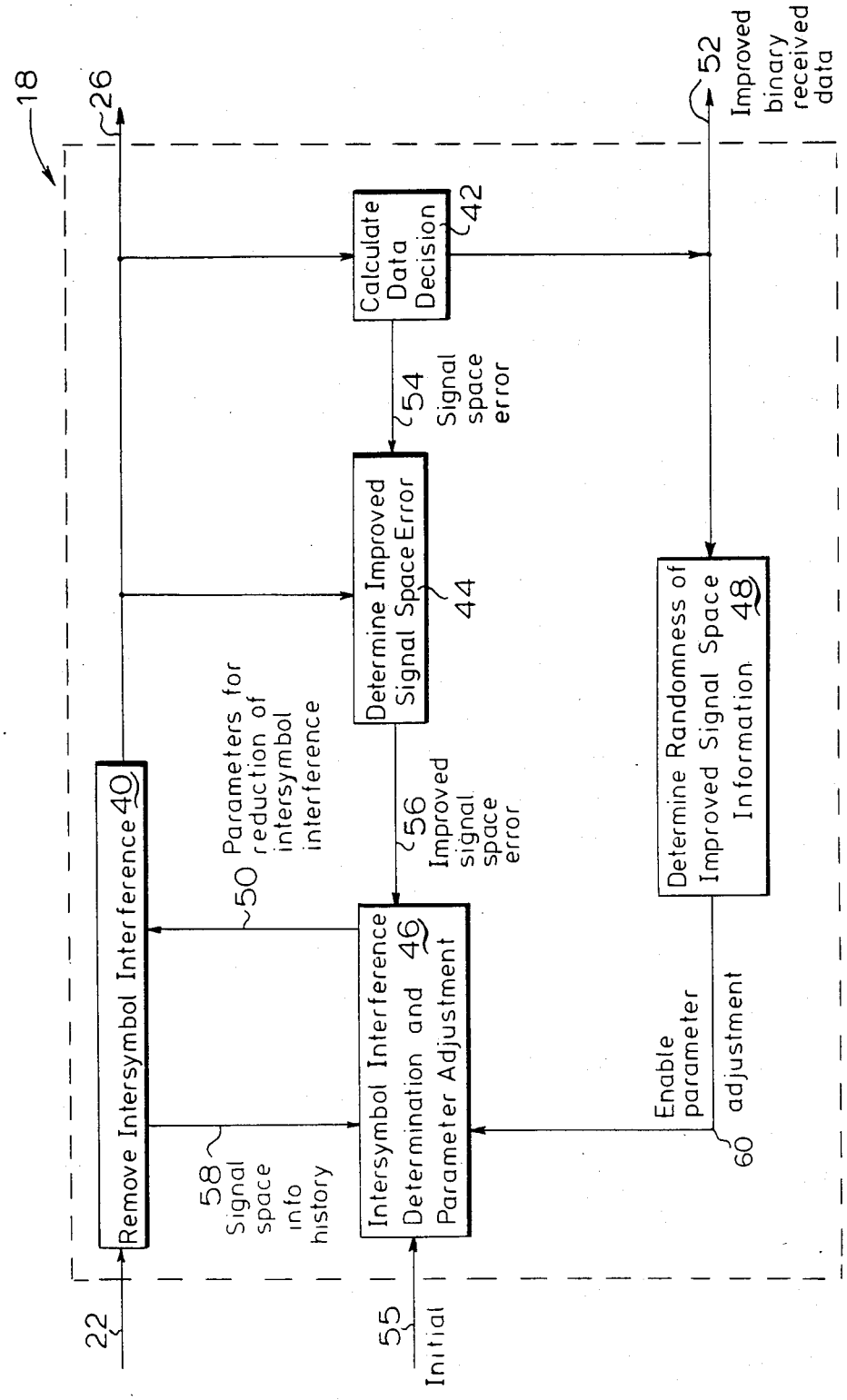
FIG. 7 is a block diagram of that portion of the system indicated by the number 18 in FIG. 5.

The detailed description of calculating means 18 is made with reference to FIG. 7.

The signal space information 22 is entered into block 40. Block 40 provides a method for removing intersymbol interference from signal space information 22, resulting in improved signal space information 26. Block 40 provides intersymbol interference removal based on parameter information 50 entered from block 46. At system initialization, no parameter information 50 is available which can in general provide improved intersymbol interference. Thus initial parameters 50 are established which make improved signal space information identical to signal space information 22. As successive calculations occur throughout calculating means 18, the parameters 50 are changed in a manner which reduces intersymbol interference improved signal space information 26.

Improved signal space information 26 is entered into block 42 which determines which transmitted symbol was most likely received. The mathematical signal space coordinates 54 of the expected signal space point are outputted to block 44. This is the result of the decisions. The determined binary received data 52 may be outputted to be used as a replacement for the received data of a typical modem system such as shown in 4A or 4B.

Now going to block 44, the determined signal space coordinates 54 and the improved signal space information 26 are entered into block 44 where an error signal 56 is determined. This error 56 converges toward zero as the calculating means 18 successively reduces intersymbol interference.

Now going to block 46, the error signal 56 is entered into block 46. Signal space information history 58 from block 40 is also entered into block 46. Calculations are performed in block 46 which correlate the present error signal 56 with signal space information history 58 and adjust parameters 50 in such a way as to successively reduce the intersymbol interference of improved signal space information 26 as determined by error signal 56. The calculations performed in block 46 are valid for proper adjustments of parameters 50 only in certain signal space information 22 randomness is present. In the event that sufficient randomness is not present as determined by block 48 adjustment of parameters 50 is inhibited.

Now considering 48, improved binary received data 52 is entered into block 48. Block 48 examines a short history of 52 to determine whether 52 is sufficiently random for operation of block 46. If sufficient randomness is determined, parameter 50 adjustment is enabled by 60, otherwise parameter adjustment is halted.

DETAILED DESCRIPTIONS OF BLOCKS 40,42,44,46 & 48

The following descriptions require a definition of consecutive sample values of various time-varying signals. The ith sample of a signal Q will be designated Q (i). All signals are complex mathematical signals and it should be understood that all such signals in general contain a real and an imaginary part unless otherwise defined. Likewise, all mathematical notations and all storage media are mathematically complex.

DESCRIPTION OF BLOCK 40

Figure 8:
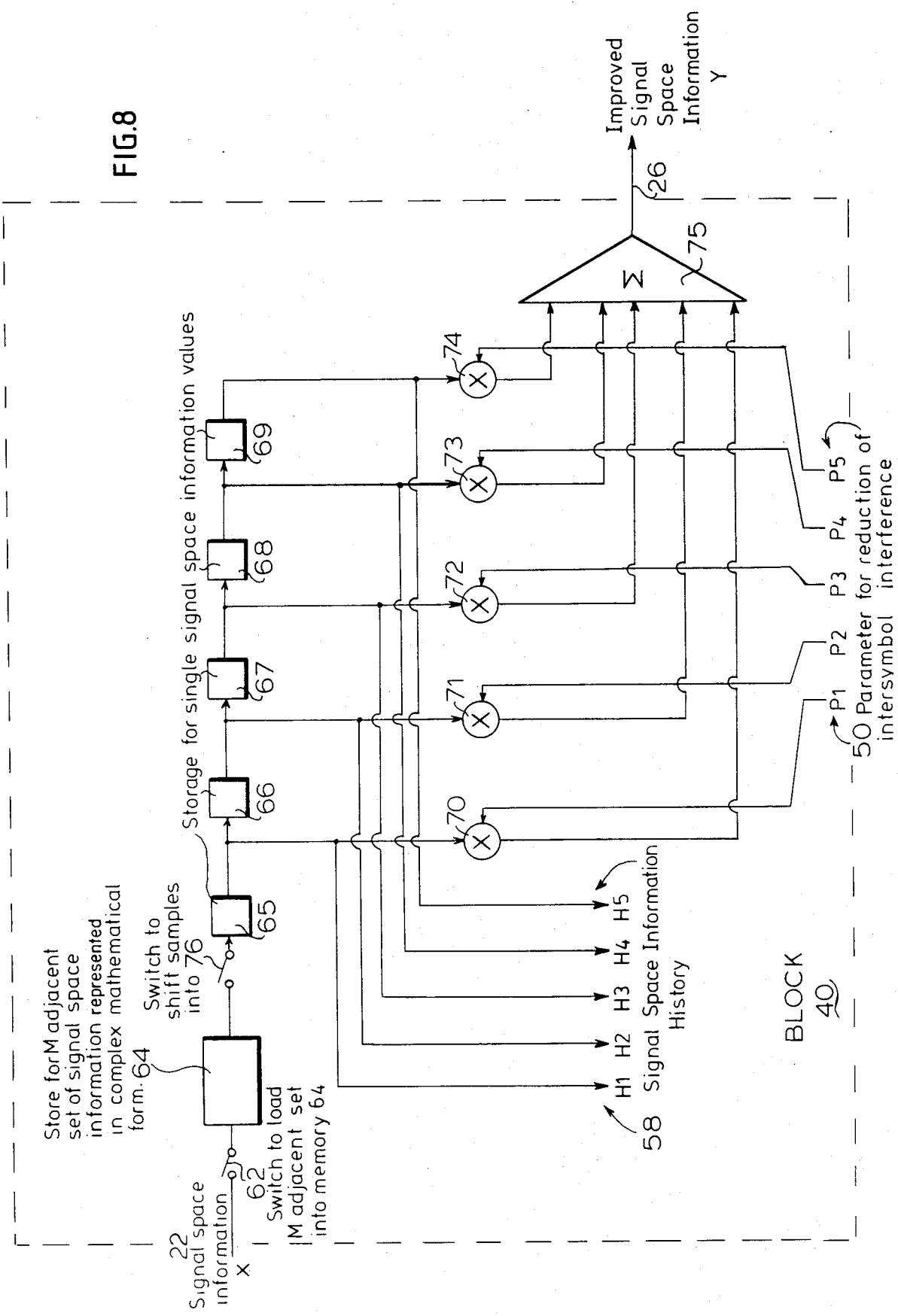
FIG. 8 is a somewhat schematic representation of block 40.

Signal space information (22), X, is available from receiver 14 (FIG. 5) each symbol time. Switch 62 is closed to enter M consecutive complex valued samples of X into memory 64 where they reside until required in calculations. FIG. 8 shows a particular implementation where five consecutive signal space information history values (58), $H_1$-$H_5$, and five parameter values ($P_1$-$P_5$) (50) are used to calculate each improved signal space information value (26), Y. In general, N values of 58 and N values of 26 may be used. Let consecutive values of X be defined as X(1), X(2), ..., X(M), ... then upon completion of loading of memory 64, successive memory locations contain X(1), X(2) X(3), ... X(M).

Calculation of consecutive value improved signal space information (26), Y, proceeds as follows. Switch 76 is closed to permit five consecutive values of memory 64 to enter and reside in memories 65-69. Upon completion: $H_1$=X(5); $H_2$=X(4); $H_3$=X(3) $H_4$=X(2); $H_5$=Y(1).

A signal value of Y is now calculated as follows:

$$Y(1) = \sum_{i=1}^{5} H_i P_i = \sum_{i=1}^{5} X(6-i) P_i$$

Upon completion of this calculation, switch 76 is closed to allow one new sample of memory 64, namely X(6), to enter memory 65 while the contents of memories 65-68 shift into the adjacent memory 66-69, respectively. The previous contents of memory 69 is discarded. A new value of Y, Y(2), is now calculated:

$$Y(2) = \sum_{i=1}^{5} H_i P_i = \sum_{i=1}^{5} X(7-i) P_i$$

Successive values of Y are calculated according to:

$$Y(L) = \sum_{i=1}^{5} X(L+5-i) P_i$$

The above process is repeated until the contents of memory 64 are depleted. For memory 64 of size M and for a N parameters, this process provides M−N+1 consecutive values of improved signal space information (26).

FIG. 8 shows a particular implementation of a data decision algorithm for determining signal space coordinates for a 4 phase PSK signal space. In general, Block 40 may contain any algorithm suitable for determining data decisions of the PSK or QAM modulation employed.

DESCRIPTION OF BLOCK 42

Figure 9:
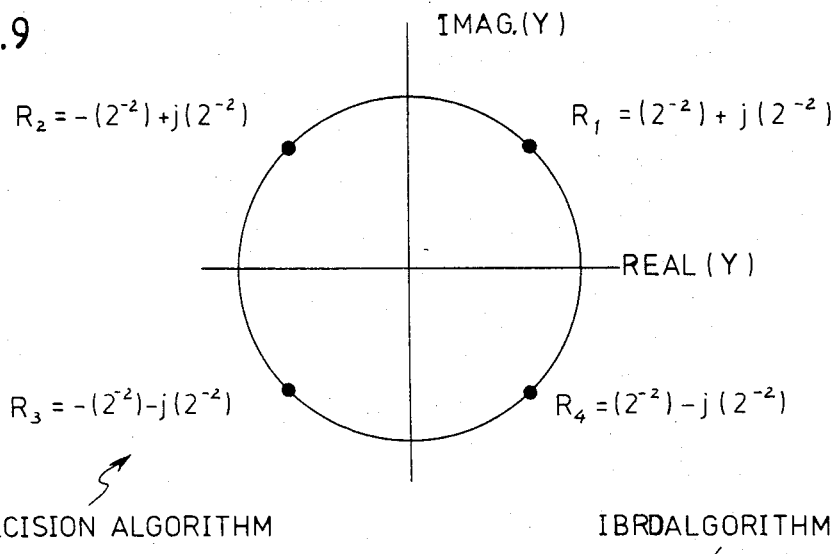
FIG. 9 depicts the operational features of block 42.

With reference to FIG. 9, Block 42 examines the value of improved signal space information (26), Y, and determine: sign [real (Y)] and sign [imag (y)]. Based on this decision, one of four possible values of signal space coordinate R is chosen.

The corresponding value of the improved binary received data (52) for this particular four-phase PSK signal space is determined from the table in FIG. 9. In this modulation method each symbol represents two binary data bits which are outputted at twice the symbol rate.

DESCRIPTION OF BLOCK 44

Figure 10:
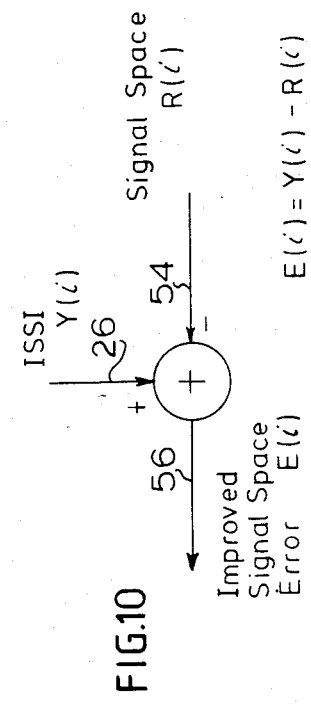
FIG. 10 is a operational diagram of block 44.

Block 44 determines the complex difference between the value of Y(i) and the corresponding R(i) as shown in FIG. 10.

DESCRIPTION OF BLOCK 46

Figure 11:
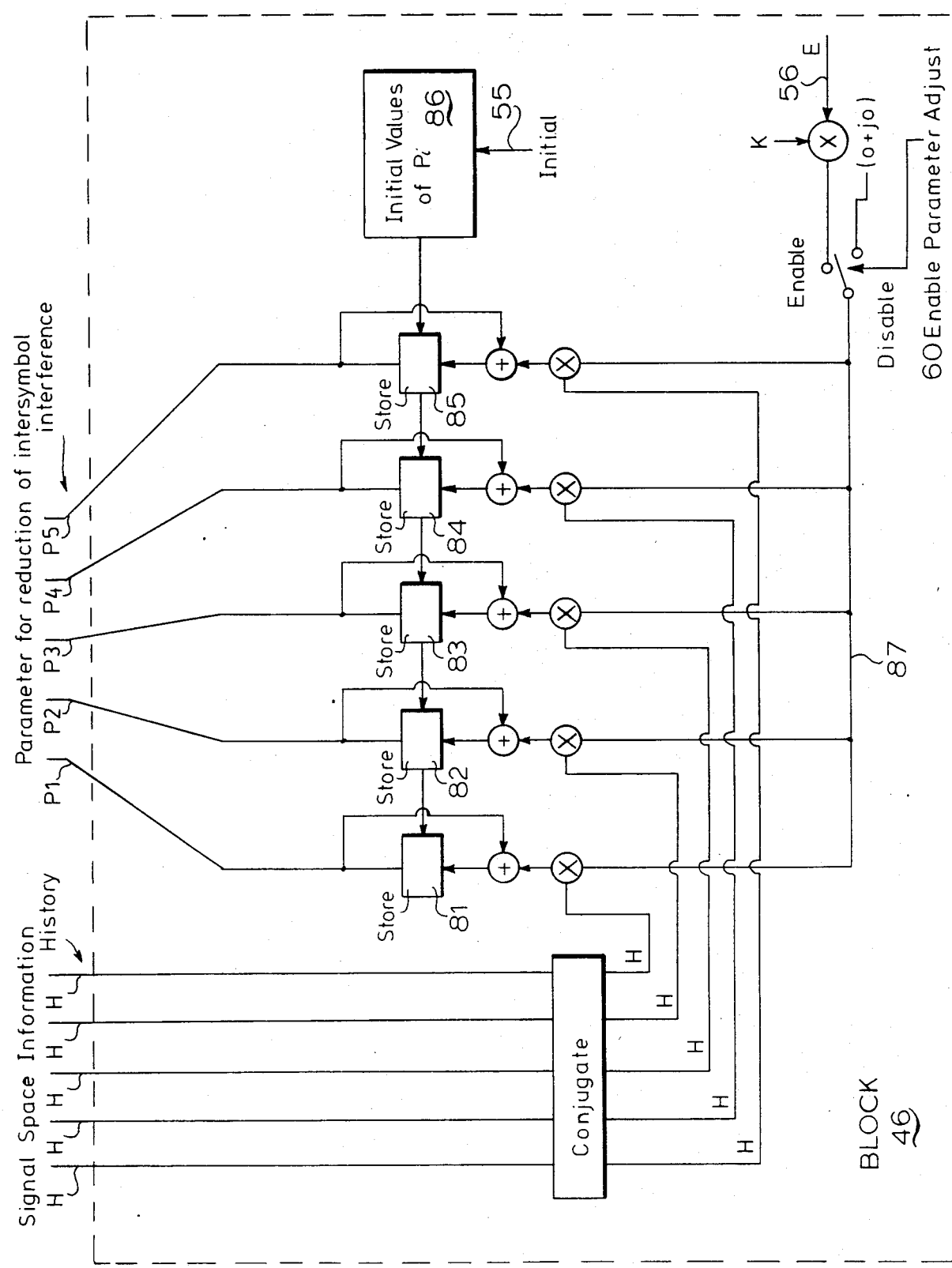
FIG. 11 is a somewhat schematic diagram of block 46.

Parameters $P_i(50)$ are stored in memories (81)–(85) as shown in FIG. 11. Initial values of $P_i$ are permanently stored in memory 86 and transferred to memories 81–85 upon activation of initiate signal (55).

Parameters $P_i$ remain unchanged unless Enable Parameter Adjust (60) is enabled. When 60 is disabled, signal 87 is set to zero (0+j0) and, hence regardless of the values of $H_i$, the contents of storages 81–85 remain unchanged and thus the $P_i$ remain unchanged.

When signal 60 is enabled, the following adjustments of parameters $P_i$ occur $$P_i(N+1) = P_i(N) KE(n) \text{ times } H_i^*(N)$$

where the asterisk indicates complex conjugate, and K is a real constant. This adjustment of parameters $P_i$ accomplishes a meansquare error minimization of the error signal E which means in effect that the mean squared inter-symbol interference present in signal space information X is reduced in improved signal space information Y.

DESCRIPTION OF BLOCK 48

Block 48 monitors IBRD to determine if certain repeatings bit patterns are present which indicate that signal space information is not sufficiently random to provide or maintain a general intersymbol interference reduction for all possible data patterns.

Figure 12:
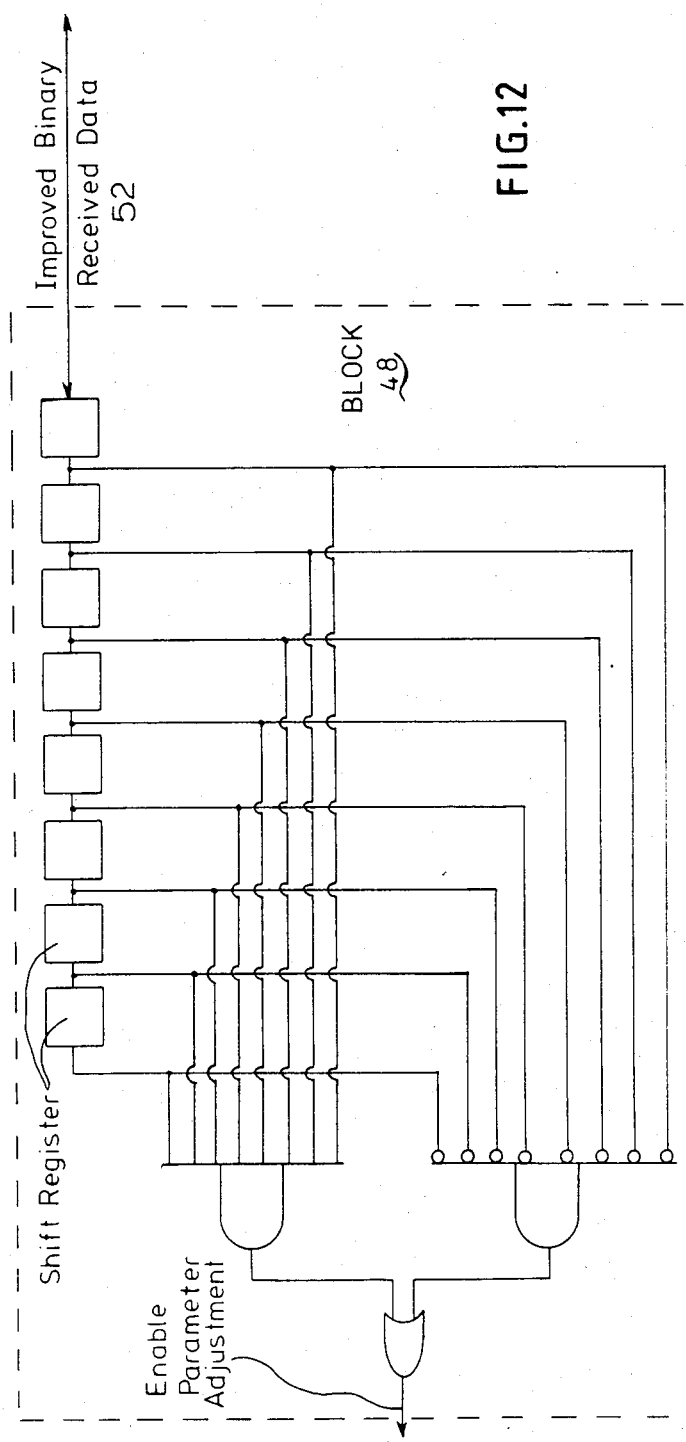
FIG. 12 is a somewhat schematic diagram of block 48.

FIG. 12 shows a typical implementation of Block 48 which provides sufficient repeating pattern monitoring in practice. This circuit halts parameter (50) adjustment in the event that 8 or more consecutive ones or zeros are present.

What is claimed:

1. In a data communication system employing QAM or PSK modulation and including a transmitter capable of transmitting a communication signal and a receiver capable of receiving the communication signal transmitted from the transmitter and generate a signal space pattern corresponding to the received communication signal wherein each point is defined in a coordinate system in which a first axis is the in-phase channel axis and a second axis is the quadrature channel axis, the improvement comprising calculating means for receiving signal space pattern information corresponding to the communication signal received and generating improved signal space pattern information, with said calculating means comprising:

first means having means receiving said signal space pattern information and adjusting said signal space pattern information in accordance with adjustment parameters for reducing intersymbol interference and generating improved signal space pattern information;

second means coupled to said first means for receiving said improved signal space pattern information therefrom having decision means reviewing the improved signal space pattern information and determining what communication signal was transmitted and generating signal space pattern information corresponding to the transmitted communication signal;

third means coupled to said first and second means and including means for receiving and comparing said improved signal space pattern information and the signal space pattern information corresponding to the transmitted communication signal and generating error signal based upon the comparison of said signals;

fourth means coupled to said third means to receive said error signal; means capable of generating a space pattern information history corresponding to signal space pattern information received by the calculating means and conveying it to said fourth means which receive said signal space pattern information history, said fourth means being capable of generating said adjustment parameters based upon its comparison of the error signal and the signal space pattern information history so as to successively reduce intersymbol interference in the improved signal space pattern information.

2. The invention in accordance with claim 1 wherein said fourth means includes adjustment means which adjusts said parameters in accordance with a change in the error signal.

3. The invention in accordance with claim 2 which includes storage means coupled to said fourth means containing parameters utilized at initial operation of the calculating means prior to adjustment by said adjustment means.

4. The invention in accordance with claims 2 which includes enable means coupled to said adjustment means and allows for adjustment of said parameters when enabled; when not enabled said enable means inhibits adjustment of said parameters.

5. The invention in accordance with claim 2 which includes monitor means monitoring the signal space pattern information corresponding to the transmitted communication signal for predetermined randomness, when predetermined randomness is present said monitor means enables said enable means to allow adjustment of said parameters by said adjustment means; when predetermined randomness is not present, said enable means inhibits adjustment of said parameters by said adjustment means.

6. In a data communication system employing QAM or PSK modulation and including a transmitter and receiver, said receiver producing a signal space pattern wherein each point is defined in a coordinate system in which a first axis is the in-phase channel axis and a second axis is the quadrature channel axis, the improvement comprising a calculating means which includes: first means for receiving signal space pattern information and generating improved signal space pattern information, said first means including means capable of generating signal space pattern information history corresponding to signal space pattern information received by the calculating means; second means for receiving signal space pattern information history and improved signal space pattern information and determining parameters for reduction of intersymbol interference; said first means having means receiving said parameters and adjusting said signal space pattern information in accordance with said parameters; and third means for receiving the improved signal space pattern information and reviewing it for errors and generating an error signal based upon said errors with said second means having means capable of receiving the error signal from the third means and adjusting said parameters in accordance with the error signal so as to successively reduce intersymbol interference in the improved space signal pattern information.

* * * * *

UNITED STATES PATENT AND TRADEMARK OFFICE
CERTIFICATE OF CORRECTION

PATENT NO. : 4,503,545
DATED : March 5, 1985
INVENTOR(S) : Gordon Bremer; Robert Wachtel It is certified that error appears in the above-identified patent and that said Letters Patent is hereby corrected as shown below:

Column 4, line 11, change "spaced" to --space--;

Column 6, line 34, change "$H_5=Y(1).$" to --$H_5=X(1).$--;

Column 7, line 33, after "$P_i(N)$" insert --+--;

Column 8, line 43, change "claims" to --claim--.

Signed and Sealed this

Sixth Day of August 1985

[SEAL]

Attest:

DONALD J. QUIGG

*Attesting Officer*   *Acting Commissioner of Patents and Trademarks*